United States Patent [19]

Dequenes et al.

[11] Patent Number: 4,817,492
[45] Date of Patent: Apr. 4, 1989

[54] DEVICE FOR GENERATING TRANSVERSE FORCE ON BALLISTIC MISSILE MOCK-UPS DURING AIR TESTS

[75] Inventors: Pierre Dequenes; Jean C. Franceschi, both of Toulon, France

[73] Assignee: Constructions Navales et Industrielle de la Mediterranee, La Seyne Sur Mer, France

[21] Appl. No.: 947,643

[22] Filed: Dec. 30, 1986

[30] Foreign Application Priority Data

Jan. 13, 1986 [FR] France ................... 86 00362

[51] Int. Cl.$^4$ .............................................. F41F 3/04
[52] U.S. Cl. .......................................... 89/1.8; 73/167; 244/110 C; 434/13
[58] Field of Search ............. 73/167; 89/1.1, 1.8, 89/1.819; 244/63, 110 C, 110 F; 434/12, 13

[56] References Cited

U.S. PATENT DOCUMENTS 3,314,285 4/1967 Brigner et al. ................... 73/167

Primary Examiner—Stephen C. Bentley
Attorney, Agent, or Firm—Sandler & Greenblum

[57] ABSTRACT

A device for generating transverse force on a ballistic missile mock-up for air tests by means of an installation including a mock-up launching tube adapted to slant at an angle and a recovery mock-up gantry composed of a support structure for the mock-up which is pivotably mounted to the recovery mock-up gantry so as to permit the support structure to slant to the same angle as the mock-up launching tube; a carrier provided with a guide along the support structure for supporting a mobile jack including a stem for adjusting the transverse force applied on one end of the stem which is in turn transmitted to the mock-up via another end of the stem; an adjustable assembly of loads for imparting a desired transverse force to the mock-up which are fixed to an end of a cable wound on an electric winch mounted at an upper end of the support structure, wherein the cable runs on return pulleys fixed to the carrier and wherein at least one of the pulleys is mounted on the stem of the jack so as to transmit the transverse force; and an adjustable cam system mounted on the support structure cooperating with a roller provided on the jack for displacing the jack by varying the transverse force by an automatic modification of counter-pressure in the jack.

7 Claims, 3 Drawing Sheets

DEVICE FOR GENERATING TRANSVERSE FORCE ON BALLISTIC MISSILE MOCK-UPS DURING AIR TESTS

FIELD OF THE INVENTION

This invention relates to a device for generating transverse effort or force on ballistic missile mock-ups during air tests of such mock-ups.

The development of ballistic missile launched from submarines is carried out by ejecting mock-ups on the ground by using a tube called air-test tube. The generator of transverse effort is designed so as to create on the mock-up a horizontal effort close to that generated in reality on ballistic missiles by the hydrodynamic effect due to the submarine speed. The effort which has to be applied by said generators has to be variable as a function of the elevation of the mock-up, the ejection speed of which being between 15 and 35 m/sec, and it has also to take in account a horizontal offset of the mock-up.

In FIG. 3 of the accompanying drawings is shown, on the right hand side, the curve E of the effort law to be applied, the maximum effort in its level portion being set between 5 and 15 tons.

SUMMARY OF THE INVENTION

The device which is the object of this invention is characterized in that it includes:

a slantable support structure pivotably mounted or, fixed on the recovery mock-up gantry, or any other framework, with the assistence of means allowing imparting to the structure the same slant as that of the mock-up launching tube;

a carrier, entrained by the mock-up, provided with a guide along the support structure, wherein the carrier support a mobile jack used for setting the transverse force which is applied on one of the ends of said jack stem and which is transmitted to the mock-up via the other end of said stem;

an adjustable load assembly, or jack assembly, imparting to the mock-up the desired transverse force, wherein the loads being fixed at the end of a cable wound on an electric winch mounted at the upper end of the support structure, wherein the cable of the winch runs on return pulleys fixed to the carrier, one of said pulleys is mounted on the stem end of the jack transmitting the transverse effort; and an adjustable cam system mounted on the support structure and cooperating with a roller provided on the jack for displacing the jack by varying the transverse effort by an automatic modification of the counter-pressure in the jack.

According to the invention, an arm articulated on the carrier provides, with the assistence of a prolongator, the connection between the end of the jack stem and the mock-up nose, said connection arm being provided with means for its retraction at the end of the application of the transverse effort.

According to another feature of this invention, the means providing the retraction of said connection arm include a cable and a pyrotechnic ejection device.

BRIEF DESCRIPTION OF THE DRAWINGS

Other features and advantages of this invention will become more apparent from the hereafter description of an illustrative embodiment thereof having no limiting character, with reference to the accompanying drawings in which.

DETAILED DESCRIPTION OF THE INVENTION

Figure 1:
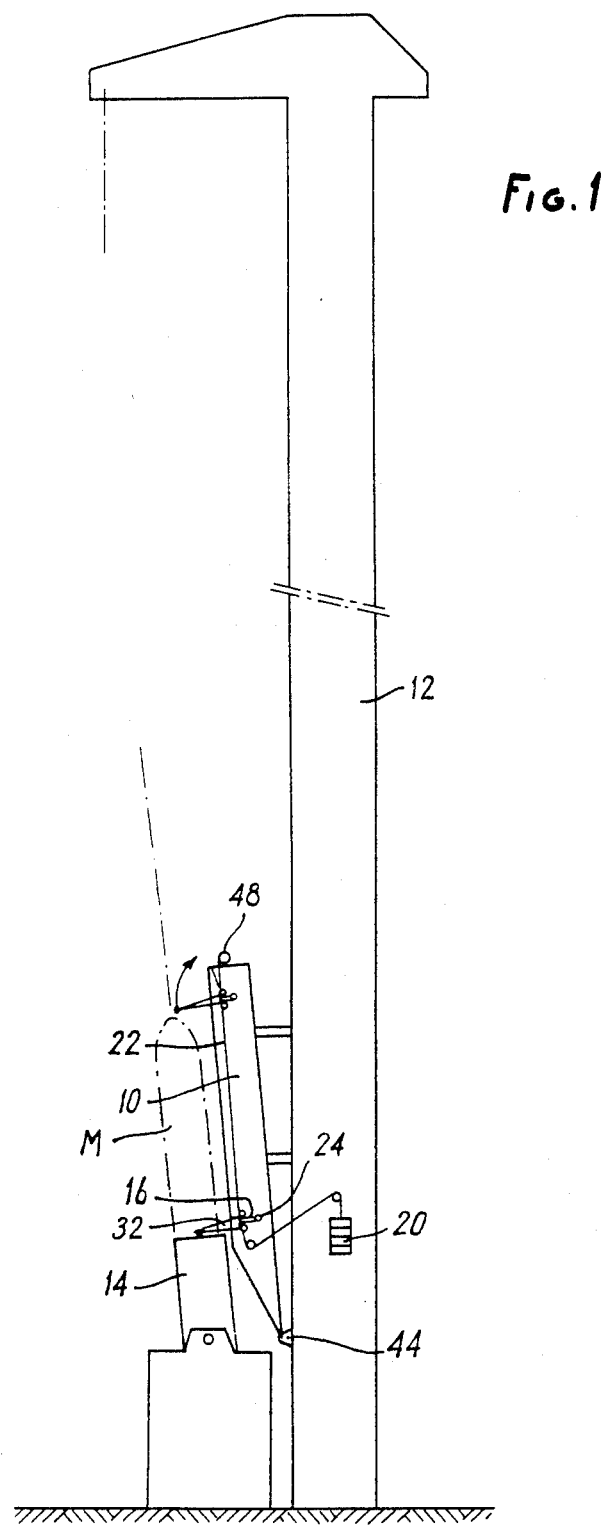
FIG. 1 is a side elevation schematic view showing the device according to the invention, mounted on the recovery gantry of the missile mock-up.
Figure 2:
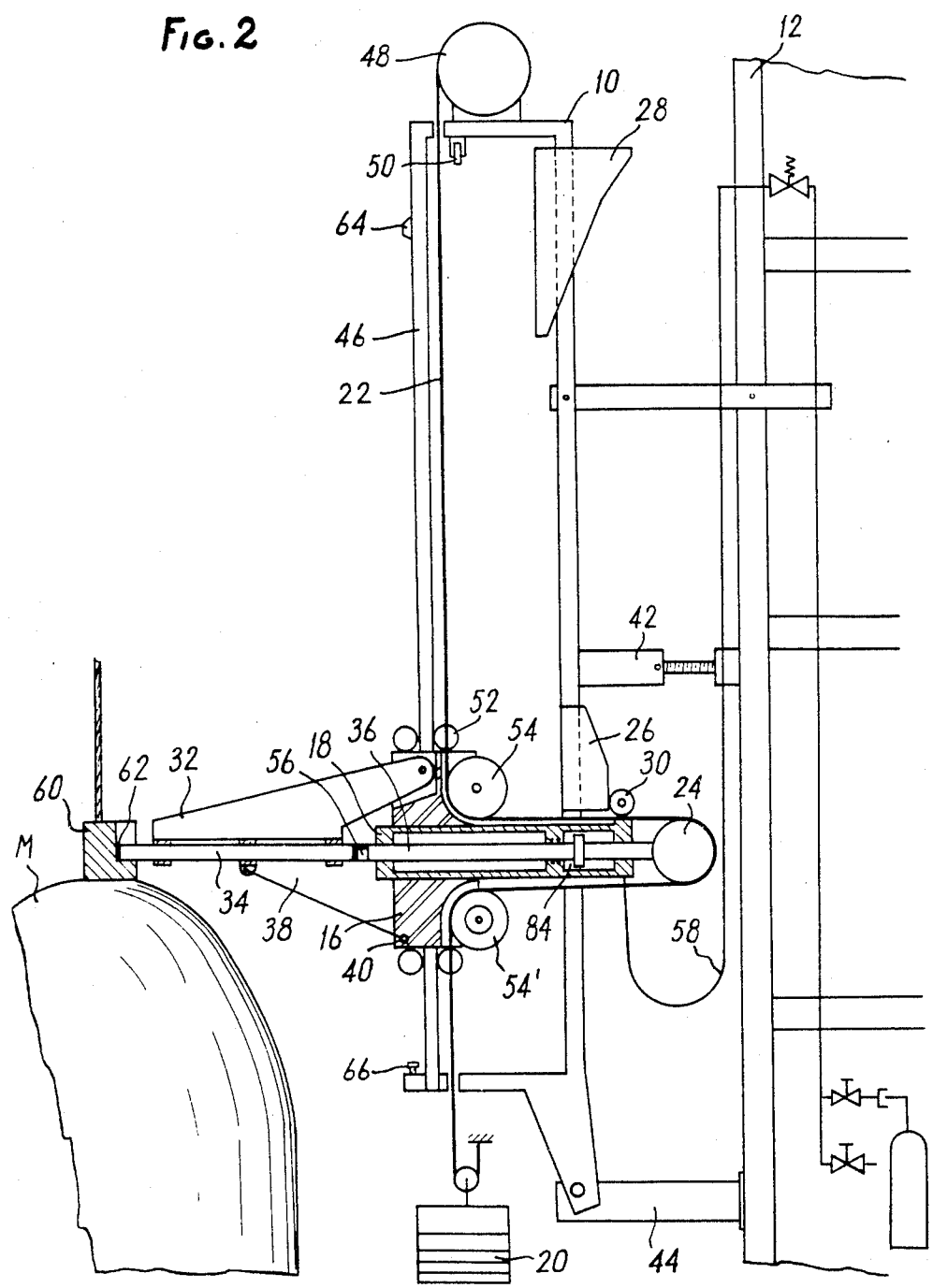
FIG. 2 is a plan view at a larger scale illustrating a detail of the generating device of transverse efforts according to this invention.

The device which is the object of this invention has therefore for object to apply a transverse force on a ballistic missile mock-up when ejected from a launching tube, the force being provided according to the invention by using an adjustable mass which is only displaced as a function of the mock-up offset. The mechanical principle used in the invention consists in compensating the force created by the mass by a jack carried by a carrier entrained by the mock-up, the cylinder of the jack being displaced by cams so as to vary the transverse force, by an automatic modification of the counter-pressure in the jack.

With reference to the drawings, one sees that the device which is the object of this invention includes substantially a slantable support structure 10, fixed on a recovery gantry 12 of mock-up M, a carrier 16 supporting the force compensation jack 18, said carrier being adapted to move on the support structure 10, a system of settable loads 20 for developing the transverse force via a transmission by pulleys and a tackle, and settable cams 26, 28 for the beginning and the end of the transverse force.

The slantable support structure 10 is preferably a mechanically welded structure made from standard profiles. It is mounted on the recovery gantry 12 of missile M via a screw setting device 42, or equivalent element, and an articulated connection arm 44, so as to follow the same inclination as that of tube 14 for launching the mock-up. The slanting support structure 10 is provided with two longitudinal rails 46 for the circulation of carrier 16, and is provided with settable cams 26 and 28. Moreover, on the upper portion of structure 10 is fixed the electric winch 48 receiving cable 22 to which is attached the system of settable loads 20. A damper 50 is provided for stopping the carrier at the end of its stroke (end of application of the effort).

The jack support carrier 16 is made of a light alloy body, provided with guiding rollers such as 52, which can roll on rails 46, and with two return pulleys 54, 54' on which passes cable 22, said pulleys being adapted for transmitting the transverse force. One of the return pulleys (in this embodiment, pulley 54') is provided with an anti-veering device for preventing the carrier falling back after the end of the mock-up launch. Carrier 16 receives mobile jack 18 providing for the setting of the transverse force. One of the ends of stem 36 of the jack piston receives a return pulley 24 on which runs cable 22, its other end being fitted out with a force sensor 56, supported by a light alloy retractable arm 32, articulated on the carrier, a damper 62, preferably in an elastomer being interposed between the mock-up nose and the end of prolongator 34. In this embodiment, the retraction of arm 32 is effected with the assistence of a system composed of a cable 38 and of a pyrotechnic ejection device 40.

The transverse force to be transmitted to the mock-up is developed by a system of adjustable loads 20 which, in this embodiment, are made of concrete blocks, which can be assembled to each other by tie-rods for obtaining a total variable load, said system of adjustable loads 20 being supported by a cable 22 which is wound on electric winch 48 after passing on return pulleys 24, 54 and 54' carried by carrier 16, in such manner that a load transmits a force equal to F.

It will be appreciated that loads 20 develop a force on return pulley 24, and that the force is transmitted to nose 60 of mock-up M via stem 36 of jack piston 18 and prolongator 34. At the beginning of the force, the cylinder of jack 18 is blocked in translation by cam 26, the force generated by the loads is cancelled by the air pressure in the jack.

During launching of mock-up M, the vertical displacement of said mock-up generates a corresponding vertical displacement of carrier 16, and said displacement generates a displacement of the cylinder of jack 18, as a function of the profile and position of cam 26. The displacement of the jack cylinder causes an increase of volume in chamber 84 of the piston of said jack, and consequently a progressive decrease of the transverse force provided by the load 20.

As soon as cylinder 18 leaves cam 26, the force developed by masses 20 is total. Prolongator 34, stem 36 of the jack piston and the cylinder of the latter follow the mock-up trajectory, the transverse displacement due to the transverse force being compensated by the displacement of stem 36 and of load 20.

The progressive cancellation of the transverse force is provided as soon as roller 30 comes in engagement with cam 28. When carrier 16 is at the end of the transverse force on cam 28, a striking pin 64 fixed to support structure 10 cocks the pyrotechnic device 40 in order to retract connection arm 32.

At the end of the test, the carrier is maintained in its high position by the anti-veering device 54' provided on the return pulley, and is returned to its low position by electric winch 48, which also lowers loads 20. As soon as the carrier is returned to its low position, defined by a lower mechanical abutment 66, the loads are laid on the ground.

The chronology of the operation of the effort generator according to the invention is therefore the following:

1—Initial State:

The mock-up is in position in its launching tube 14, and carrier 16 is in its low position. Cams 26 and 28 are set in order to obtain the desired transverse force curve.

Connection arm 32 is retracted, loads 20 are laid on the ground and there is no pressure in chamber 84 of jack 18.

2—Operation:

Prolongator 34, maintained on connection arm 32, is put in position on the mock-up nose 60, and the ejection pyrotechnic device 40 is cocked.

Cable 22 is set under tension, by acting on electric winch 48, the force value being checked by sensor 56.

Jack 18 is set under pressure, by admitting compressed air in its chamber 84. Return pulley 24 is set under load by lifting loads 20 to a high position, and the pneumatic pressure value in chamber 64 of the jack is set in order to obtain the desired force (for example 50 daN) on sensor 56.

The mock-up is then launched.

Figure 3:
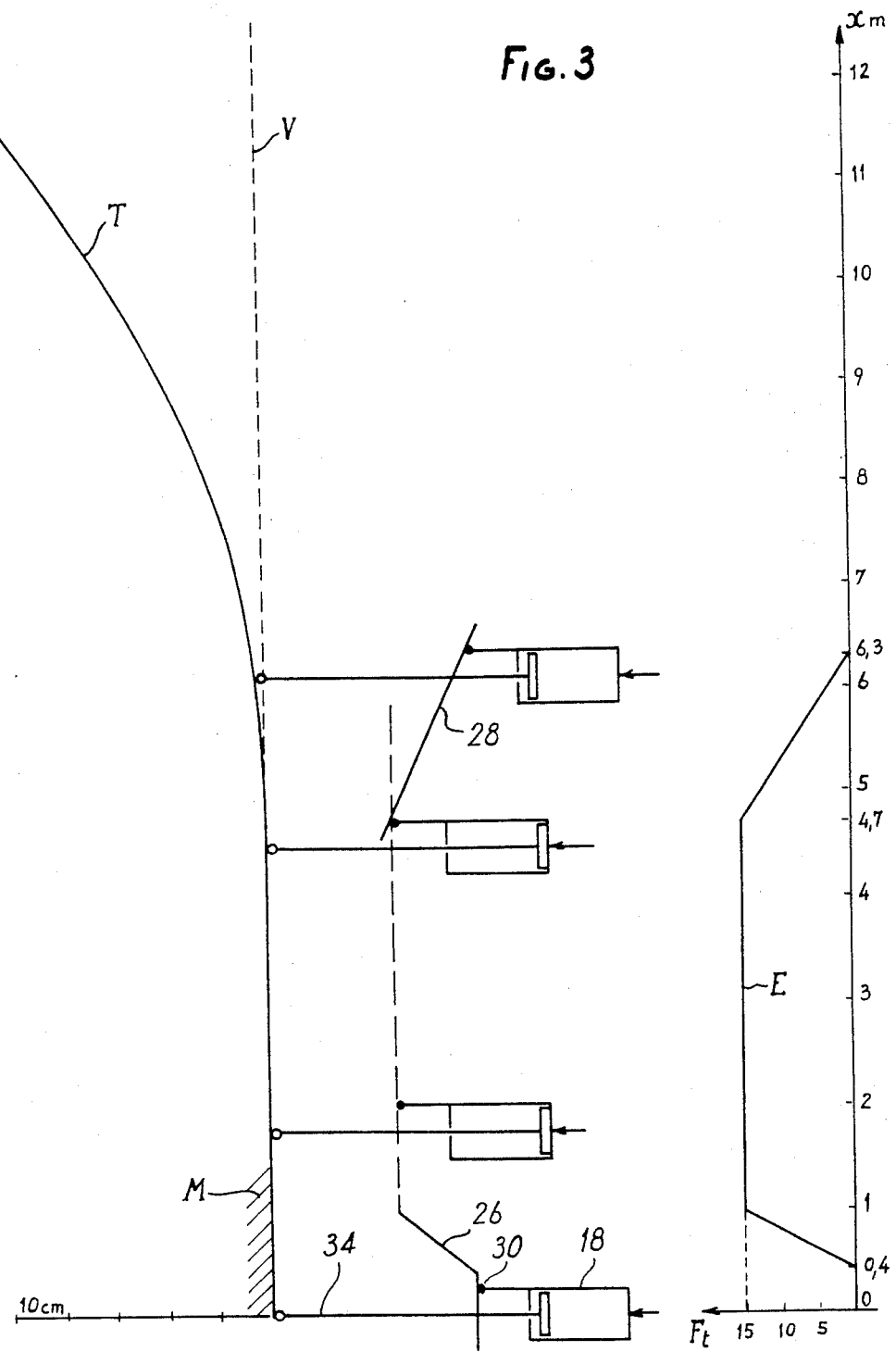
FIG. 3 is a diagramme showing the operation of the device according to this invention.

The transverse force generating device operates as hereabove described by imparting to the mock-up the offset trajectory T shown in FIG. 3, the carrier remaining in the high position after launching. Finally, the carrier and the loads are brought down by the electric winch 48.

Obviously, this invention is not limited to the embodiment described and shown, and it encompasses all variants thereof. Moreover, the transverse effort, in a plane perpendicular to the firing plane, can be exerted on one side or the other of the mock-up.

What is claimed is:

1. A device for generating transverse force on a ballistic missile mock-up for air tests by means of of an installation including a mock-up launching tube adapted to slant at an angle and a recovery mock-up gantry comprising:

(a) a support structure for said mock-up pivotally mounted to a recovery mock-up gantry so as to permit said structure to slant at substantially the same angle as said mock-up launching tube;

(b) a carrier provided with a guide along said support structure, said carrier supporting a mobile jack having a stem for adjusting transverse force applied on one end of said stem which is transmitted to said mock-up via another end of said stem;

(c) an adjustable assembly of loads for imparting a desired transverse force to said mock-up, said loads being fixed at an and of a cable wound on an electric winch mounted at an upper end of said support structure, said cable running on return pulleys fixed to said carrier, wherein at least one of said pulleys is mounted on said stem end of said jack transmitting said transverse force; and (d) an adjustable cam system mounted on said support structure and cooperating with a roller provided on said jack for displacing said jack by varying said transverse force by an automatic modification of counter-pressure in said jack.

2. A device according to claim 1, comprising an arm articulated on said carrier and a prolongator interconnecting an end of said stem and a portion on a nose of said mock-up, said arm being provided with means for retracting said arm at the end of the application of the transverse force.

3. A device according to claim 2, wherein said means for retracting include a cable and a pyrotechnic ejection device.

4. A device according to claim 1, wherein cams of said cam system are adjustably positioned on said support structure in order to control the application of said transverse force.

5. A device according to claim 1, wherein one of said return pulleys of said carrier is provided with an anti-veering device for preventing said carrier from falling back at the end of the stroke.

6. A device according to claim 1, wherein said assembly of variable loads is moved by a jack.

7. A device according to claim 1, wherein said transverse force is exerted in a plane perpendicular to a plane of ejection on either side of said mock-up.

* * * * *

UNITED STATES PATENT AND TRADEMARK OFFICE
CERTIFICATE OF CORRECTION

PATENT NO. : 4,817,492

DATED : April 4, 1989

INVENTOR(S) : Pierre DEQUENES et al.

It is certified that error appears in the above-identified patent and that said Letters Patent is hereby corrected as shown below:

At column 1, line 21, change "in" to ---into---.
At column 1, line 32, change "assistence" to ---assistance---.
At column 1, line 37, change "support" to ---supports---.
At column 1, line 43, change "being" to ---are---.
At column 1, line 56, change "assistence" to a---assistance---.
At column 2, line 9, change "diagramme" to ---diagram---.
At column 2, line 66, change "assistence" to ---assistance---.
At column 4, line 32, change "and" to ---end---.

Signed and Sealed this

Eighth Day of October, 1991

Attest:

HARRY F. MANBECK, JR.

*Attesting Officer*     *Commissioner of Patents and Trademarks*